(12) United States Patent
Kwon et al.

(10) Patent No.: US 8,331,765 B2
(45) Date of Patent: Dec. 11, 2012

(54) METHOD AND APPARATUS FOR PROTECTING AGAINST COPYING CONTENTS BY USING WIHD DEVICE

(75) Inventors: Chang-yeul Kwon, Yongin-si (KR); Yang-lim Choi, Seongnam-si (KR); Il-ju Na, Yongin-si (KR); Jae-min Lee, Suwon-si (KR); Guoping Fan, Suwon-si (KR); Soo-young Kim, Suwon-si (KR); Young-jae Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 324 days.

(21) Appl. No.: 12/713,540

(22) Filed: Feb. 26, 2010

(65) Prior Publication Data

US 2010/0220977 A1 Sep. 2, 2010

Related U.S. Application Data

(60) Provisional application No. 61/155,998, filed on Feb. 27, 2009.

(30) Foreign Application Priority Data

Oct. 8, 2009 (KR) ........................ 10-2009-0095668

(51) Int. Cl.
*H04N 9/80* (2006.01)
(52) U.S. Cl. ...................................................... 386/252
(58) Field of Classification Search .................. 386/252
See application file for complete search history.

(56) References Cited

U.S. PATENT DOCUMENTS

| | | | |
|---|---|---|---|
| 6,201,834 B1 | 3/2001 | Shu et al. | |
| 2006/0153375 A1* | 7/2006 | Yi | .................................... 380/44 |
| 2007/0202842 A1 | 8/2007 | Shao et al. | |
| 2007/0268868 A1 | 11/2007 | Singh et al. | |
| 2009/0290600 A1* | 11/2009 | Tatsuta et al. | ................. 370/476 |

FOREIGN PATENT DOCUMENTS

| | | |
|---|---|---|
| KR | 1020080095833 A | 10/2008 |
| WO | 2004/073201 A1 | 8/2004 |

OTHER PUBLICATIONS

International Search Report issued on Sep. 16, 2010 in the corresponding International Patent Application No. PCT/KR2010/001132.

* cited by examiner

*Primary Examiner* — Thai Tran
*Assistant Examiner* — William Tran
(74) *Attorney, Agent, or Firm* — Sughrue Mion, PLLC

(57) ABSTRACT

A method and apparatus for protecting against copying high definition (HD) contents transmitted in a wireless HD (WiHD) network by using a WiHD source or sink device, the method including: determining a type of copy protection of contents transmitted in the WiHD network; calculating accumulatively a number of media access control (MAC) sub-packets as a input counter information, wherein the MAC sub packets constitute a MAC payload including the contents; packetizing the type of copy protection and the input counter information into a MAC packet; and transmitting the MAC packet to a WiHD sink device.

31 Claims, 9 Drawing Sheets

METHOD AND APPARATUS FOR PROTECTING AGAINST COPYING CONTENTS BY USING WIHD DEVICE

CROSS-REFERENCE TO RELATED PATENT APPLICATIONS

This application claims the benefit of U.S. Provisional Application No. 61/155,998, filed on Feb. 27, 2009, in the United States Patent and Trademark Office and claims priority from Korean Patent Application No. 10-2009-0095668, filed on Oct. 8, 2009, in the Korean Intellectual Property Office, the disclosures of which are incorporated herein by reference in their entirety.

BACKGROUND

1. Field

Exemplary embodiments relate to copy protection, and more particularly, to a method and apparatus for protecting against copying high definition (HD) contents transmitted in a wireless HD (WiHD) network.

2. Description of the Related Art

Digital rights management (DRM) is a technology for safely managing and protecting digital contents in all instances of marketing that include generating and using of the digital contents and for controlling the use of digital contents by providing authorization information to a user. Methods for implementing DRM may include passive protection and active protection. In passive protection, the use of the digital contents of an unauthorized user is not limited, but the unauthorized user's legal self-consciousness is led such that the unauthorized user may restrain from illegal behaviors themselves. On the other hand, in active protection, an unauthorized user's access to the digital contents is actively blocked via encryption.

In content protection technology, which is one of the active copy protection technologies for implementing DRM, digital contents are encrypted using an encryption key that is subordinate to a storage medium or a device so that, even when contents are copied to another medium or device, the copied contents cannot be used. Copy protection technologies include digital transmission content protection (DTCP), high-bandwidth digital content protection (HDCP), and content protection for prerecorded media (CPPM).

DTCP is a copy protection technology for IEEE-1394, that is, a digital input/output standard for digital video home systems (DVHSs) and personal video recorders (PVRs). DTCP has been suggested by Hitachi, Ltd., Intel Corporation, Matsushita Electric Industrial Co., Ltd., Sony Electronics Inc., and Toshiba Corporation. HDCP is a copy protection technology for digital visual interfaces (DVIs) and high-definition multimedia interfaces (HDMIs) used as digital outputs for displays. HDCP has been suggested by Intel Corporation and is licensed by the Digital Content Protection (DCP) LLC organization.

CPPM is a copy protection technology for contents distributed using movable storage media such as DVD-Rs, secure digital (SD) memory cards, etc. CPPM has been suggested by IBM, Intel Corporation, Matsushita Electric Industrial Co., Ltd., and Toshiba Corporation.

Meanwhile, wireless high definition (WiHD) is a wireless digital network interface standard for transmission of wireless HD digital signals at a frequency band around 60 GHz and has been suggested by a WiHD consortium. WiHD uses mmWave technology with a frequency band around 60 GHz that supports a physical layer data transmission rate of several gigabits per second (Gbps) and may be used to transmit an uncompressed high definition television (HDTV) signal in a wireless manner.

SUMMARY

Exemplary embodiments provide a method and apparatus for protecting against copying high definition (HD) contents transmitted in a wireless HD (WiHD) network by using a WiHD device.

The exemplary embodiments also provide a computer readable recording medium having recorded thereon a program for causing a computer to execute the method.

According to an aspect of the exemplary embodiments, there is provided a method of protecting against copying contents transmitted in a wireless HD (WiHD) network by using a WiHD source device, the method including: determining a type of copy protection of contents transmitted in the WiHD network; calculating accumulatively a number of media access control (MAC) sub-packets as input counter information, wherein the MAC sub-packets constitute a MAC payload including the contents; packetizing the determined type of copy protection and the input counter information into a MAC packet; and transmitting the MAC packet to a WiHD sink device.

The type of copy protection of contents may include at least one of digital transmission content protection (DTCP) and high-bandwidth digital content protection (HDCP).

The packetizing of the determined type of copy protection and the input counter information may include packetizing the determined type of copy protection into a Content Protection (CP) header of the MAC packet and packetizing the input counter information into a CP sub-packet header of each of the MAC sub-packets.

The method may further include calculating stream counter information from a stream identifier for identifying a stream for transmitting the contents.

The method may further include packetizing the stream counter information into a MAC header of the MAC packet or a MAC sub-packet header of each of the MAC sub-packets.

The MAC payload may include the contents that are encrypted using the input counter information and the stream counter information.

The method may further include packetizing the stream counter information counted from a stream identifier for identifying a stream for transmitting the contents into a MAC header of the MAC packet or a MAC sub-packet header of each of the MAC sub-packets.

The MAC payload may include the contents that are encrypted using the input counter information and the stream counter information.

The method may further include packetizing the determined type of copy protection of the contents into a MAC capability information element (IE) transmitted when the WiHD source device joins in the WiHD network.

The MAC packet may be a high rate physical layer (PHY) (HRP) MAC packet or a low rate PHY (LRP) MAC packet transmitted in the WiHD network.

According to another aspect of the exemplary embodiments, there is provided a method of protecting against copying contents transmitted in a wireless HD (WiHD) network by using a WiHD sink device, the method including: receiving a media access control (MAC) packet including input counter information and a type of copy protection of encrypted contents transmitted in the WiHD network from a WiHD source device, wherein the input counter information is accumulatively calculated with a number of media access control (MAC) sub-packets, and the MAC sub-packets constitute a MAC payload including the encrypted contents; obtaining stream counter information calculated from a stream identifier for identifying a stream for transmitting the encrypted contents; and decrypting the encrypted contents by using the input counter information and the stream counter information.

The type of copy protection of the encrypted contents may include at least one of digital transmission content protection (DTCP) and high-bandwidth digital content protection (HDCP).

The obtaining of the stream counter information may include, if the received MAC packet includes the stream counter information, depacketizing the MAC packet or directly calculating the stream counter information from a stream identifier for identifying the stream for transmitting the encrypted contents.

The MAC packet may be a high rate physical layer (PHY) (HRP) MAC packet or a low rate PHY (LRP) MAC packet transmitted in the WiHD network.

According to another aspect of the exemplary embodiments, there is provided a computer readable recording medium having recorded thereon a program for causing a computer to execute the method.

According to another aspect of the exemplary embodiments, there is provided a wireless high definition (WiHD) source device, the WiHD source device including: a copy protection type determining unit for determining a type of copy protection of contents transmitted in a WiHD network; an input counter calculating unit for calculating accumulatively a number of media access control (MAC) sub-packets as input counter information, wherein the MAC sub-packets constitute a MAC payload including the contents; a packetizing unit for packetizing the type of copy protection and the input counter information into a MAC packet; and a transmitting unit for transmitting the MAC packet to a WiHD sink device.

According to another aspect of the exemplary embodiments, there is provided a wireless high definition (WiHD) sink device, the WiHD sink device including: a receiving unit for receiving a media access control (MAC) packet including input counter information and a type of copy protection of encrypted contents transmitted in the WiHD network from a WiHD source device, wherein the input counter information is accumulatively calculated with a number of media access control (MAC) sub-packets, and the MAC sub-packets constitute a MAC payload including the encrypted contents; a stream counter obtaining unit for obtaining stream counter information calculated from a stream identifier for identifying a stream for transmitting the encrypted contents; and a decryption unit for decrypting the encrypted contents by using the input counter information and the stream counter information.

BRIEF DESCRIPTION OF THE DRAWINGS

The above and other features and advantages will become more apparent by describing in detail the exemplary embodiments with reference to the attached drawings in which.

DETAILED DESCRIPTION

Figure 1:
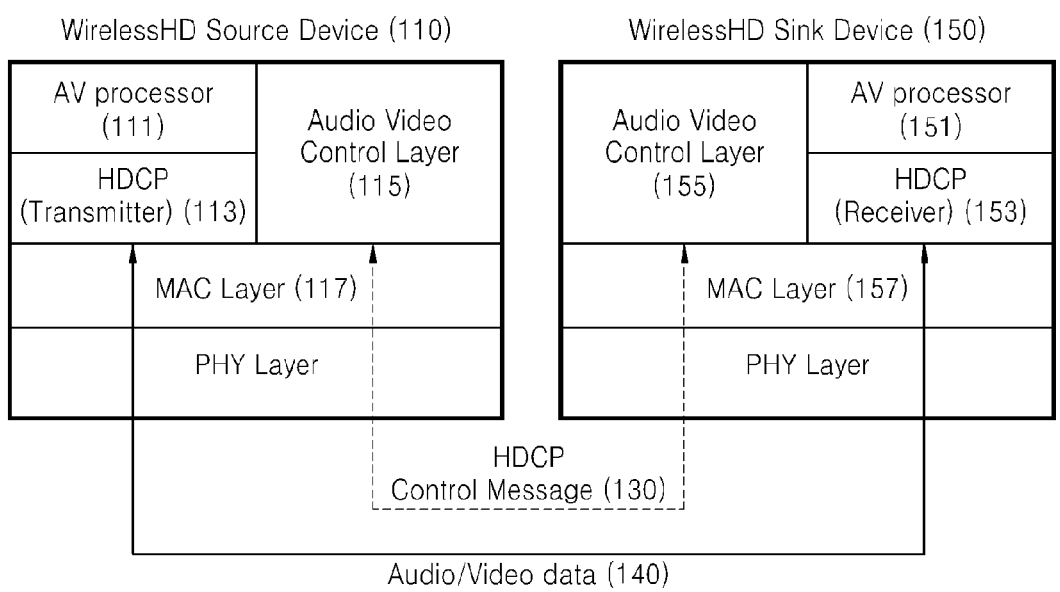
FIG. 1 is a schematic diagram illustrating a method of protecting against copying high definition (HD) contents transmitted in a wireless HD (WiHD) network by using a WiHD device, according to an exemplary embodiment.

Hereinafter, exemplary embodiments will be described in detail by explaining the exemplary embodiments with reference to the attached drawings.

Like reference numerals in the drawings denote like elements. In the drawings, the thicknesses of layers and regions are exaggerated for clarity. Expressions such as "at least one of" when preceding a list of elements, modify the entire list of elements and does not modify the individual elements of the list. In addition, each "unit" described below comprises hardware.

FIG. 1 is a schematic diagram illustrating a method of protecting against unauthorized copying of high definition (HD) contents transmitted in a wireless HD (WiHD) network by using a WiHD source or sink device, according to an exemplary embodiment. WiHD is a wireless digital network interface standard for transmitting uncompressed HD television (HDTV) signals in a wireless manner. Referring to FIG. 1, a WiHD source device 110 transmits an uncompressed HDTV signal to a WiHD sink device 150. The WiHD sink device 150 receives the uncompressed HDTV signal from the WiHD source device 110. Examples of the WiHD source device 110 include a set top box and a media server and examples of the WiHD sink device 150 include a DVD player, a HDTV, a home theater, and an overhead projector.

A high-bandwidth digital content protection (HDCP) module (transmitter) 113 and a HDCP module (receiver) 153 are copy protection units suggested for high-definition multimedia interfaces (HDMIs) used with displays for digital output. The HDCP module (transmitter) 113 and the HDCP module (receiver) 153 may operate in a WiHD network through which uncompressed HD video data are transmitted.

The WiHD source device 110 determines a type of copy protection of contents transmitted in the WiHD network, for example, digital transmission content protection (DTCP) or HDCP. In the present exemplary embodiment, the type of copy protection of contents may be DTCP or HDCP. However, the type of copy protection is not limited thereto, and a different type of copy protection may be applied to the exemplary embodiments.

When the WiHD source device 110 determines HDCP as the type of copy protection of contents, the HDCP module (transmitter) 113 of the WiHD source device 110 encrypts audio/video (AV) data 140 by using a predetermined ciphering engine when the AV data (raw data) 140, generated by an AV processor 111, and a predetermined encryption key stream are input to the HDCP module (transmitter) 113. An advanced encryption standard (AES) may be used for a HDCP standard used in the predetermined ciphering engine. However, the ciphering engine is not limited thereto, and a different ciphering engine may be applied to the exemplary embodiments.

The predetermined encryption key stream input to the ciphering engine may be generated using session key information, stream counter information, and input counter information.

The session key information is generated after the WiHD source device 110 and the WiHD sink device 150 are authenticated by using a predetermined authentication protocol in AV control layers 115 and 155 of the WiHD source device 110 and the WiHD sink device 150, respectively. In the present exemplary embodiment, the predetermined authentication protocol may be an authentication and key exchange (AKE). However, the authentication protocol is not limited thereto, and a different authentication protocol may be applied to the exemplary embodiments.

The stream counter information is information that is used to identify multimedia streams transmitted between source and sink devices. When the AV data 140 includes a MAC payload, the AV data 140 is segmented into a plurality of MAC sub-packets. The input counter information is information that is accumulatively calculated by determining the number of MAC sub-packets.

The HDCP module (transmitter) 113 of the WiHD source device 110 forwards the type of copy protection used to encrypt the AV data 140, the stream counter information, the input counter information, and the encrypted AV data 140 to a MAC layer 117. The MAC layer 117 of the WiHD source device 110 packetizes the type of copy protection used to encrypt the AV data 140, the stream counter information, and the input counter information (and the encrypted AV data 140) into a header of a MAC packet or a header of a MAC sub-packet. The WiHD source device 110 transmits the MAC packet including the encrypted AV data 140 to the WiHD sink device 150.

A MAC layer 157 of the WiHD sink device 150 receives the MAC packet including the encrypted AV data 140, the type of copy protection, the stream counter information, and the input counter information from the WiHD source device 110.

When the type of copy protection is HDCP, the HDCP module (receiver) 153 decrypts the encrypted AV data 140 by using the session key information, the stream counter information, and the input counter information. An AV processor 151 of the WiHD sink device 150 consumes the decrypted AV data 140.

According to another exemplary embodiment, the WiHD source and sink devices 110 and 150 encrypt uncompressed HD data by using copy protection in a WiHD network through which the uncompressed HD data is transmitted in a wireless manner so that, even when contents are copied to other media or devices, the copied contents may not be used and the HD data may be protected. Accordingly, unauthorized use of the content can be prevented.

Figure 2:
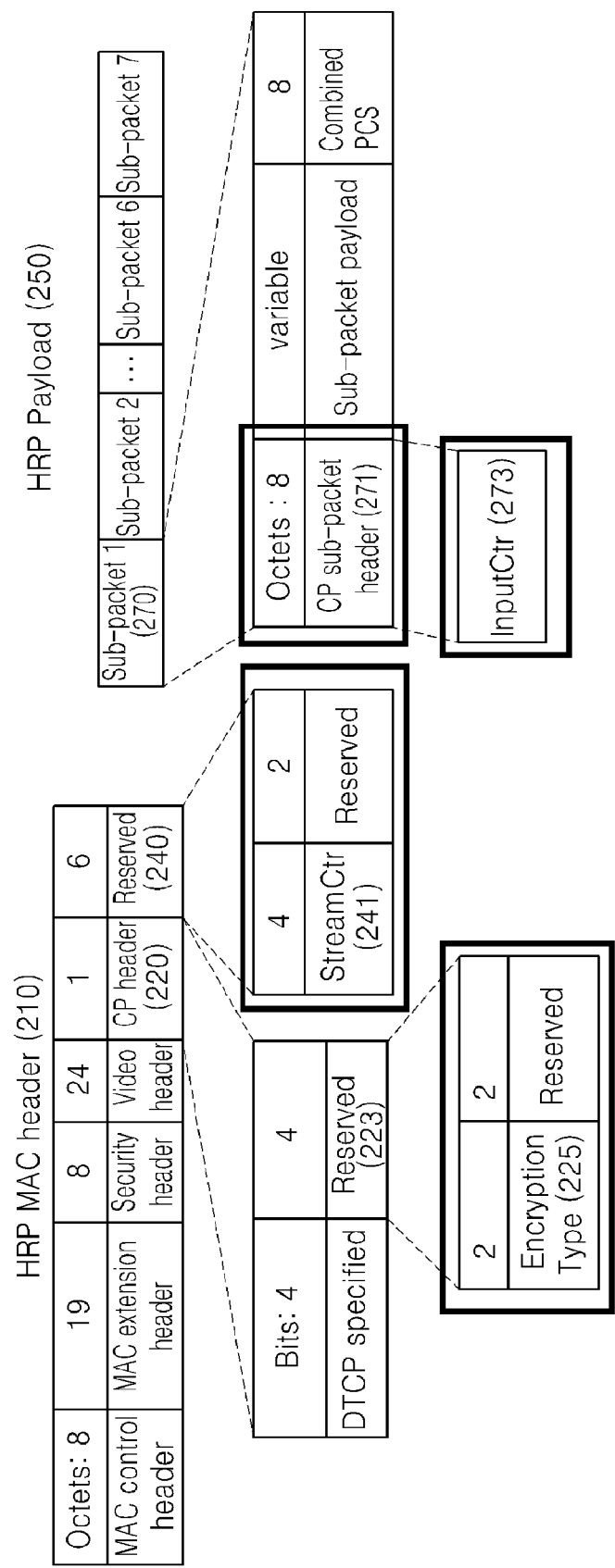
FIG. 2 illustrates a structure of a high rate physical layer (PHY) (HRP) media access control (MAC) packet according to an exemplary embodiment.

FIG. 2 illustrates a structure of a high rate physical layer (PHY) (HRP) media access control (MAC) packet according to an exemplary embodiment. Referring to FIG. 2, the WiHD devices 110 and 150 use two channels, i.e., a symmetrical low rate PHY (LRP) data/control channel and an asymmetrical HRP data channel.

The LRP data/control channel operates in two modes such as an omni-directional mode or a directional mode (i.e., a mode in which a beam is generated). The omni-directional mode is used in transmission of control data, such as a beacon or an acknowledgement (ACK), and supports a data rate of about 2.5 to 10 megabits per second (Mbps). The directional mode (i.e., the mode in which a beam is generated) is used in transmission of audio data and supports a data rate of about 20 to 40 Mbps.

The HRP data channel is a directional channel (i.e., a channel in which a beam is generated), and is used in transmission of uncompressed video data and supports a data rate of several gigabits per second (Gbps), e.g., 1 to 4 Gbps.

The HRP MAC packet of FIG. 2 is used when the WiHD source device 110 transmits encrypted, uncompressed video data through the HRP channel.

An "Encryption Type" field 225 of an HRP MAC header 210 represents the type of copy protection of the contents transmitted in the WiHD network. In the present embodiment, "0", "1", "2", and "3" are defined as values of the "Encryption Type" field 225 and represent "No encryption", "DTCP encryption", "HDCP2.0 encryption", and "Reserved", respectively. In the present exemplary embodiment, the type of copy protection of contents may be DTCP or HDCP. However, that the type of copy protection is not limited thereto, and other types of copy protection may be applied to the exemplary embodiments. In the present exemplary embodiment, the "Encryption Type" field 225 is described using a "Reserved" field 223 of a "CP header" field 220 of the HRP MAC header 210.

A "StreamCtr" field 241 of the HRP MAC header 210 represents stream counter information that is used to identify multimedia streams transmitted between the WiHD source device 110 and the WiHD sink device 150. In the present exemplary embodiment, the "StreamCtr" field 241 is described using a "Reserved" field 240 of the HRP MAC header 210.

When the AV data 140 includes a MAC payload (250), the WiHD source device 110 segments the AV data 140 into a plurality of MAC sub-packets 270. An "InputCtr" field 273 of each HRP MAC sub-packet 270 represents input counter information that is accumulatively calculated with the number of MAC sub-packets 270. The "InputCtr" field 273 is described using a CP sub-packet header 271 of each MAC sub-packet 270.

When the "Encryption Type" field 225 represents "HDCP2.0 encryption", the HDCP module (receiver) 153 of the WiHD sink device 150 decrypts the encrypted AV data 140 by using the "StreamCtr" field 241, the "InputCtr" field 273 and session key information.

The remaining fields of the HRP MAC header 210 follow a WiHD standard, and thus, a detailed description thereof will not be provided here.

Figure 3:
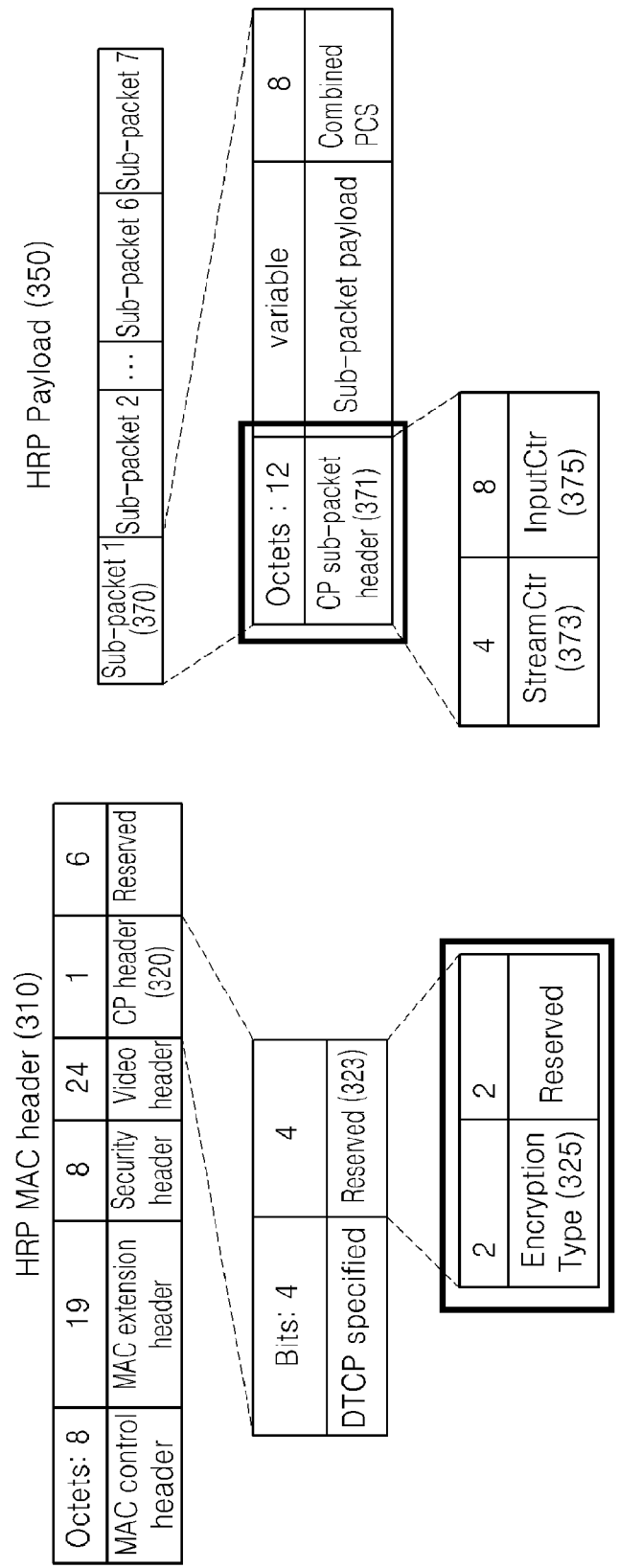
FIG. 3 illustrates a structure of a HRP MAC packet according to another exemplary embodiment.

FIG. 3 illustrates a structure of a HRP MAC packet according to another exemplary embodiment. Referring to FIG. 3, an "Encryption Type" field 325 of a HRP MAC header 310 represents the type of copy protection of the contents transmitted in a WiHD network. In the present embodiment, "0", "1", "2", and "3" are defined as values of the "Encryption Type" field 325 and represent "No encryption", "DTCP encryption", "HDCP2.0 encryption", and "Reserved", respectively. In the present exemplary embodiment, the type of copy protection of the contents may be DTCP or HDCP. However, the type of copy protect is not limited thereto, and other types of copy protection may be applied to the exemplary embodiments. In the present exemplary embodiment, the "Encryption Type" field 325 is described using a "Reserved" field 323 of a "CP header" field 320 of the HRP MAC header 310.

When the AV data 140 is packetized into a MAC payload (350), the WiHD source device 110 segments the AV data 140 into a plurality of MAC sub-packets 370.

A "StreamCtr" field 373 of each HRP MAC sub packet 370 represents stream counter information that is used to identify multimedia streams transmitted between source and sink devices. In the present exemplary embodiment, the "StreamCtr" field 373 is described using a CP sub-packet header 371 of each HRP MAC sub-packet 370. An "InputCtr" field 375 of the HRP MAC sub-packet 370 represents input counter information that is accumulatively calculated with the number of MAC sub-packets 370. The "InputCtr" field 375 is described using the CP sub-packet header 371 of each MAC sub-packet 370.

When the "Encryption Type" field 325 represents "HDCP2.0 encryption", the HDCP (receiver) module 153 of the WiHD sink device 150 decrypts the encrypted AV data 140 using the "StreamCtr" field 373, the "InputCtr" field 375 and session key information.

The remaining fields of the HRP MAC sub-packets 370 follow a WiHD standard, and thus a detailed description thereof will not be provided here.

Figure 4:
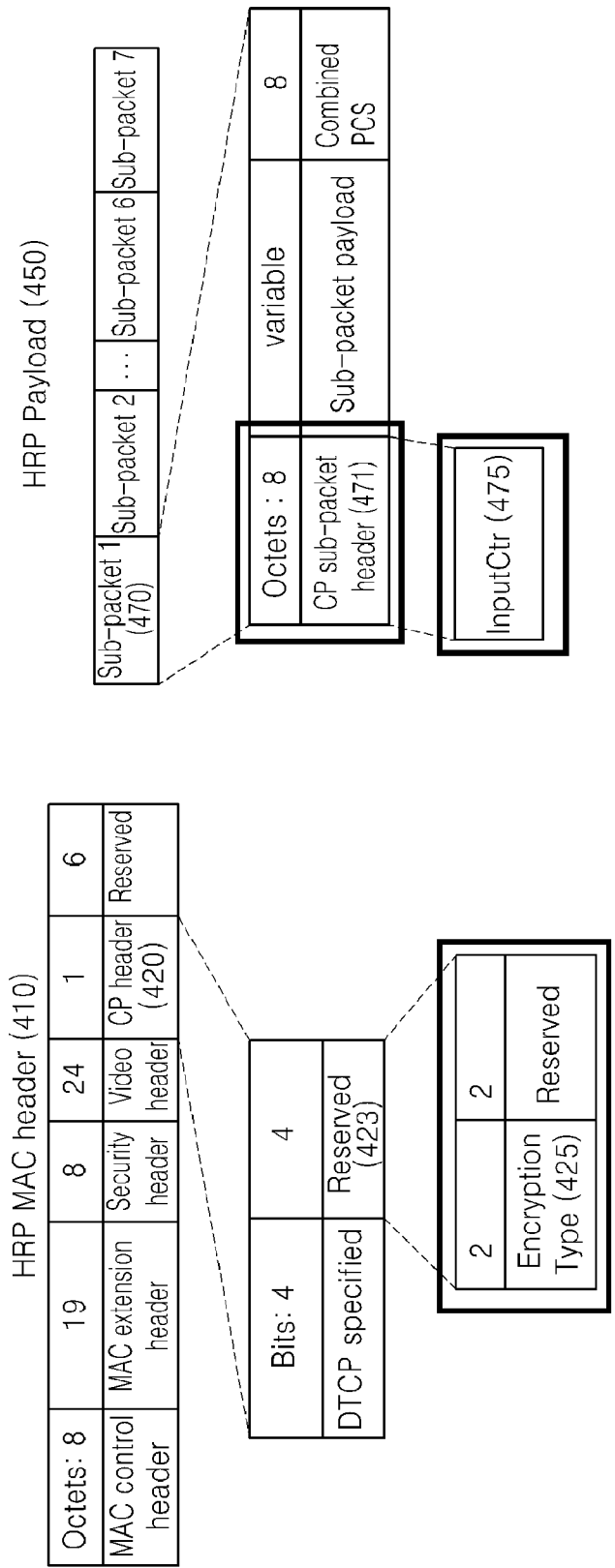
FIG. 4 illustrates a structure of a HRP MAC packet according to another exemplary embodiment.

FIG. 4 illustrates a structure of a HRP MAC packet according to another exemplary embodiment. Referring to FIG. 4, an "Encryption Type" field 425 of a HRP MAC header 410 represents the type of copy protection of the contents transmitted in a WiHD network. In the present exemplary embodiment, "0", "1", "2", and "3" are defined as values of the "Encryption Type" field 425 and represent "No encryption", "DTCP encryption", "HDCP2.0 encryption", and "Reserved", respectively. In the present exemplary embodiment, the type of copy protection of contents may be DTCP or HDCP. However, the type of copy protection is not limited thereto, and other types of copy protection may be applied to the exemplary embodiments. In the present exemplary embodiment, the "Encryption Type" field 425 is described using a "Reserved" field 423 of a "CP header" field 420 of the HRP MAC header 410.

When the AV data 140 is packetized into a MAC payload (450), the WiHD source device 110 segments the AV data 140 into a plurality of MAC sub-packets 470.

An "InputCtr" field 475 of each HRP MAC sub-packet 470 represents input counter information that is accumulatively calculated with the number of MAC sub-packets 470. The "InputCtr" field 475 is described using a CP sub-packet header 471 of each HRP MAC sub-packet 470.

When the "Encryption Type" field 425 represents "HDCP2.0 encryption", the HDCP (receiver) module 153 of the WiHD sink device 150 decrypts the encrypted AV data 140 using stream counter information, the "InputCtr" field 475, and session key information. In the present exemplary embodiment, the stream counter information is directly calculated from a stream identifier for identifying streams for transmitting the AV data 140 by using a predetermined algorithm. In the present exemplary embodiment, the stream counter information is not transmitted from the WiHD source device 110 and represents the same value as the stream counter information that is used when the HDCP module 113 of the WiHD source device 110 encrypts the AV data 140. Thus, both the WiHD source device 110 and the WiHD sink device 150 directly calculate the stream counter information from the stream identifier by using the same, predetermined algorithm.

The remaining fields of the HRP MAC sub packets 470 follow a WiHD standard, and thus a detailed description thereof will not be provided here.

Figure 5:
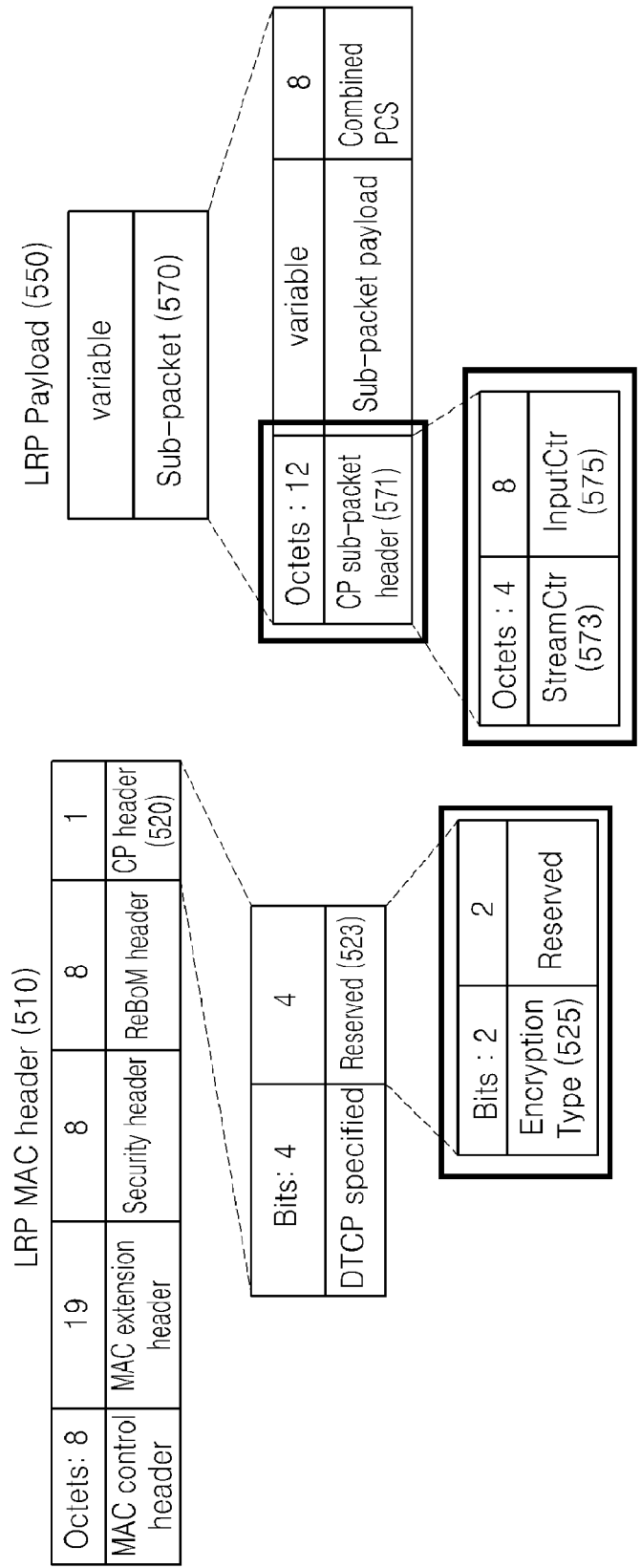
FIG. 5 illustrates a structure of a low rate PHY (LRP) MAC packet according to an exemplary embodiment.

FIG. 5 illustrates a structure of a low rate PHY (LRP) MAC packet according to an exemplary embodiment. Referring to FIG. 5, the WiHD source device 110 uses the LRP MAC packet when transmitting audio data. Thus, the LRP MAC packet of FIG. 5 is used when the WiHD source device 110 transmits audio data. An "Encryption Type" field 525 of an LRP MAC header 510 represents the type of copy protection of the contents transmitted in the WiHD network. In the present exemplary embodiment, "0", "1", "2", and "3" are defined as values of the "Encryption Type" field 525 and represent "No encryption", "DTCP encryption", "HDCP2.0 encryption", and "Reserved", respectively. In the present exemplary embodiment, the type of copy protection of the contents may be DTCP or HDCP. However, the type of copy protection is not limited thereto, and other types of copy protection may be applied to the exemplary embodiments. In the present exemplary embodiment, the "Encryption Type" field 525 is described using a "Reserved" field 523 of a "CP header" field 520 of the LRP MAC header 510.

A "StreamCtr" field 573 of each of LRP MAC sub-packets 570 represents stream counter information that is used to identify multimedia streams transmitted between the WiHD source device 110 and the WiHD sink device 150. In the present exemplary embodiment, the "StreamCtr" field 573 is described using a CP sub-packet header 571 of each LRP MAC sub-packet 570. An "InputCtr" field 575 of the LRP MAC sub-packet 570 represents input counter information that is accumulatively calculated with a number of LRP MAC sub-packets 570. The "InputCtr" field 575 is described using the CP sub packet header 571 of each LRP MAC sub-packet 570.

When the "Encryption Type" field 525 represents "HDCP2.0 encryption", the HDCP (receiver) module 153 of the WiHD sink device 150 decrypts the encrypted AV data 140 by using the "StreamCtr" field 573 and the "InputCtr" field 575 and session key information.

The remaining fields of the LRP MAC sub-packets 570 follow a WiHD standard, and thus, a detailed description thereof will not be provided here.

Figure 6:
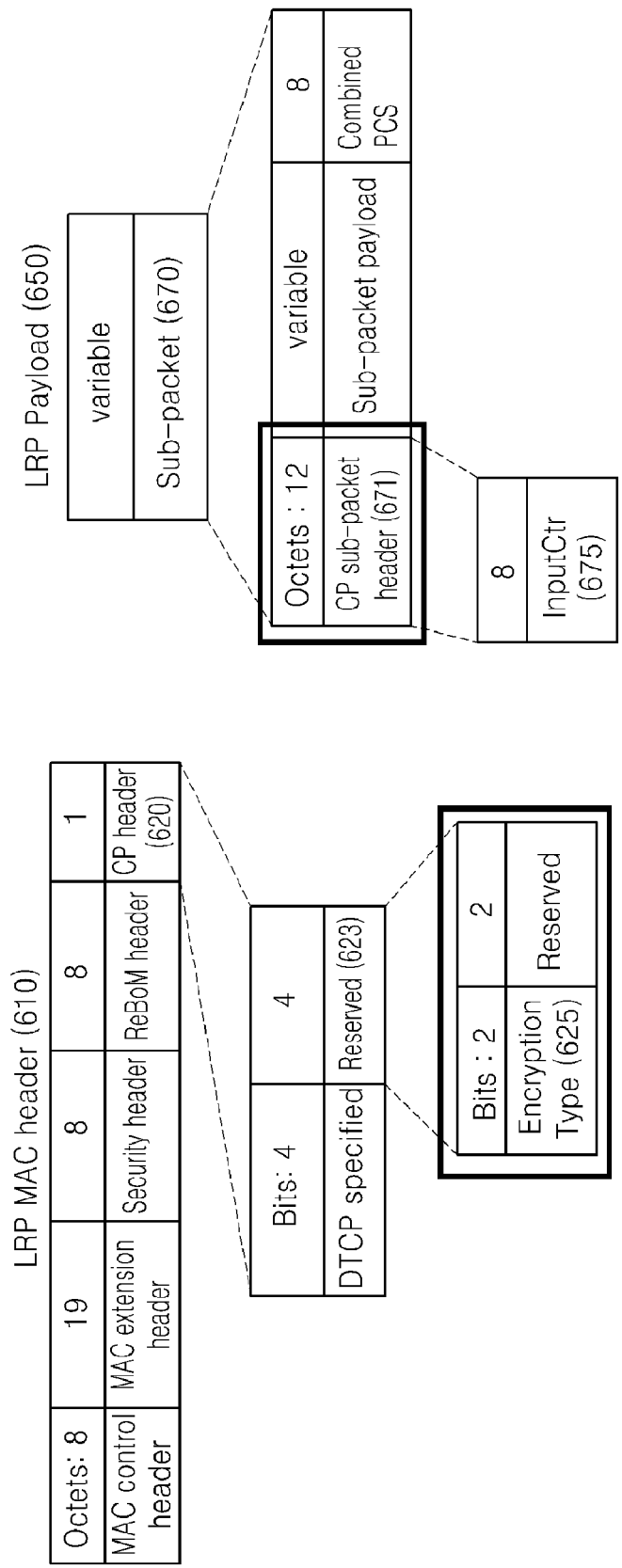
FIG. 6 illustrates a structure of an LRP MAC packet according to another exemplary embodiment.

FIG. 6 illustrates a structure of an LRP MAC packet according to another exemplary embodiment. Referring to FIG. 6, an "Encryption Type" field 625 of an LRP MAC header 610 represents the type of copy protection of contents transmitted in the WiHD network. In the present embodiment, "0", "1", "2", and "3" are defined as values of the "Encryption Type" field 625 and represent "No encryption", "DTCP encryption", "HDCP2.0 encryption", and "Reserved", respectively. In the present exemplary embodiment, the type of copy protection of the contents may be DTCP or HDCP. However, the type of copy protection is not limited thereto, and other types of copy protection may be applied to the exemplary embodiments. In the present exemplary embodiment, the "Encryption Type" field 625 is described using a "Reserved" field 623 of a "CP header" field 620 of the LRP MAC header 610.

An "InputCtr" field 675 of each of LRP MAC sub-packets 670 is input counter information that is accumulatively calculated with the number of LRP MAC sub-packets 670. The "InputCtr" field 675 is described using a CP sub packet header 671 of each LRP MAC sub-packet 670.

When the "Encryption Type" field 625 represents "HDCP2.0 encryption", the HDCP module (receiver) 153 of the WiHD sink device 150 decrypts the encrypted AV data 140 by using stream counter information, the "InputCtr" field 675, and session key information. In the exemplary present exemplary embodiment, the stream counter information is directly calculated from a stream identifier for identifying streams for transmitting the AV data 140 by using a predetermined algorithm. In the present exemplary embodiment, the stream counter information is not transmitted from the WiHD source device 110 and represents the same value as the stream counter information that is used when the HDCP module 113 of the WiHD source device 110 encrypts the AV data 140. Thus, both the WiHD source device 110 and the WiHD sink device 150 directly calculate the stream counter information from the stream identifier by using the same, predetermined algorithm.

The remaining fields of the LRP MAC sub-packets 670 follow a WiHD standard, and thus, a detailed description thereof will not be provided here.

Figure 7:
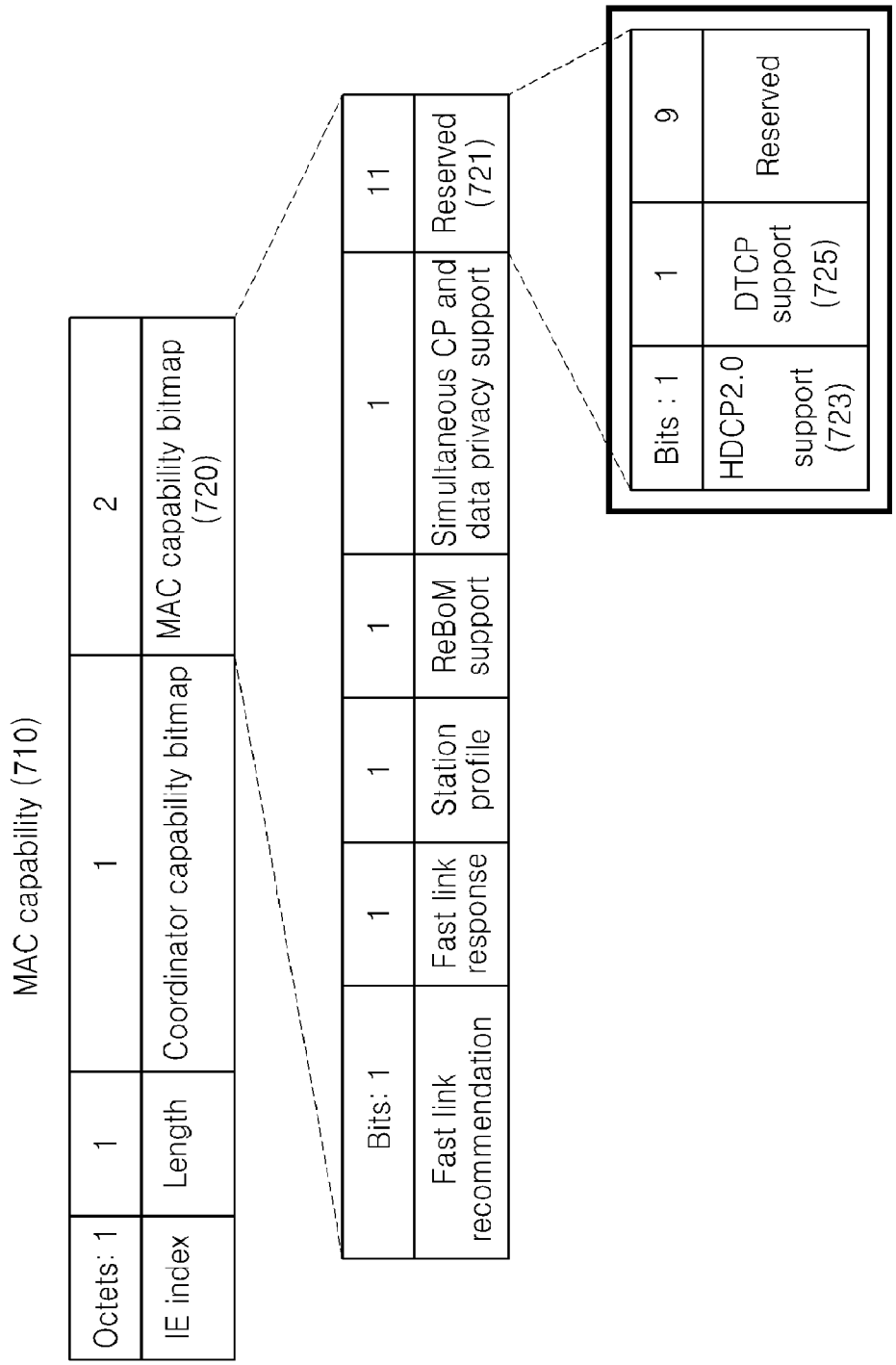
FIG. 7 illustrates a structure of a MAC capability information element (IE) packet according to an exemplary embodiment.

FIG. 7 illustrates a structure of a MAC capability information element (IE) packet according to an exemplary embodiment. Referring to FIG. 7, a MAC capability IE 710 is a packet that is transmitted when the WiHD device, having had received a beacon from a coordinator of the WiHD network, joins in the WiHD network. The MAC capability IE 710 includes various capability information about the WiHD device.

A "HDCP2.0 support" bit 723 represents the type of copy protection that is supported by the WiHD device and represents whether "HDCP" is to be supported. The "HDCP2.0 support" bit 723 is described using a "Reserved" field 721 of a "MAC capability bitmap" field 720 of the MAC capability IE 710.

A "DTCP support" bit 725 represents another type of copy protection that is supported by the WiHD device and represents whether "DTCP" is to be supported. The "DTCP support" bit 725 is described using the "Reserved" field 721 of the "MAC capability bitmap" field 720 of the MAC capability IE 710.

The remaining fields of the "MAC capability bitmap" fields 720 follow a WiHD standard, and thus, a detailed description thereof will not be provided here.

Figure 8:
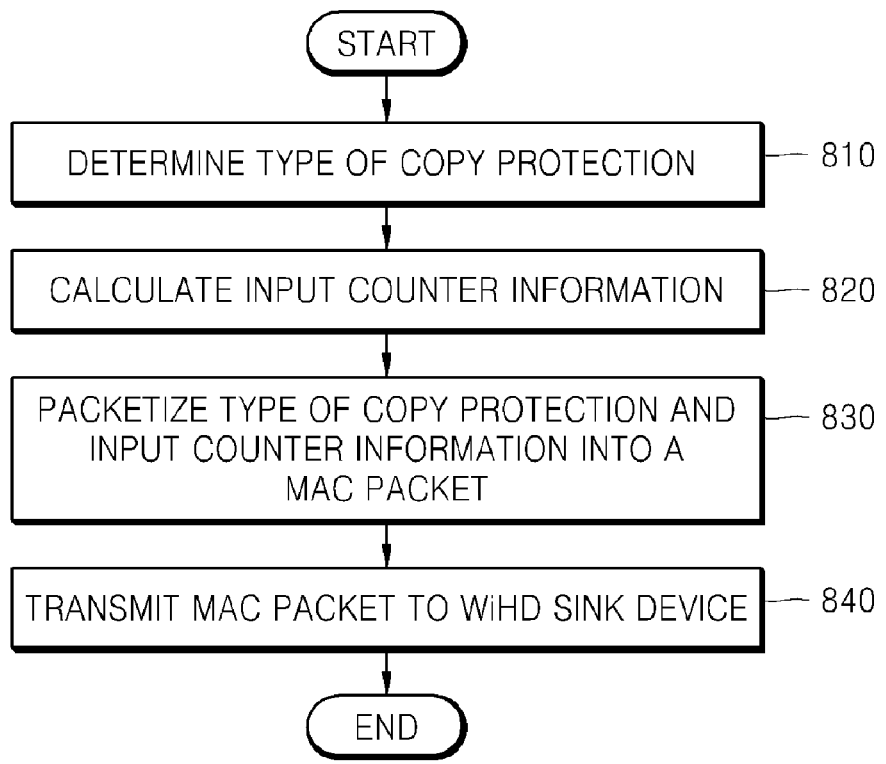
FIG. 8 is a flowchart illustrating a method of protecting against copying HD contents transmitted in a WiHD network by using a WiHD source device, according to an exemplary embodiment.

FIG. 8 is a flowchart illustrating a method of protecting against copying HD contents transmitted in a WiHD network by using the WiHD source device 110, according to an exemplary embodiment. Referring to FIG. 8, in Operation 810, the WiHD source device 110 determines the type of copy protection of contents transmitted in the WiHD network. In the present exemplary embodiment, the type of copy protection of contents may be "No encryption", "DTCP encryption", or "HDCP2.0 encryption". However, the type of copy protection is not limited thereto, and other types of copy protection may be applied to the exemplary embodiments.

In Operation 820, the WiHD source device 110 determines a number of MAC sub packets that constitute a MAC payload which includes the contents as input counter information.

In Operation 830, the WiHD source device 110 packetizes the determined type of copy protection and the calculated input counter information, respectively, into a MAC packet. The WiHD source device 110 may also packetize stream counter information that is calculated from a stream identifier into the MAC packet.

The WiHD source device 110 packetizes the type of copy protection into a CP header of the MAC packet and packetizes the input counter information into a CP sub-packet header of each MAC sub-packet. The WiHD source device 110 may packetize the stream counter information into a MAC header of the MAC packet or a MAC sub-packet header of the MAC sub-packet.

In Operation 840, the WiHD source device 110 transmits the MAC packet to the WiHD sink device 150. The payload of the MAC packet includes contents that are encrypted using the input counter information and the stream counter information that is calculated from the stream identifier.

Figure 9:
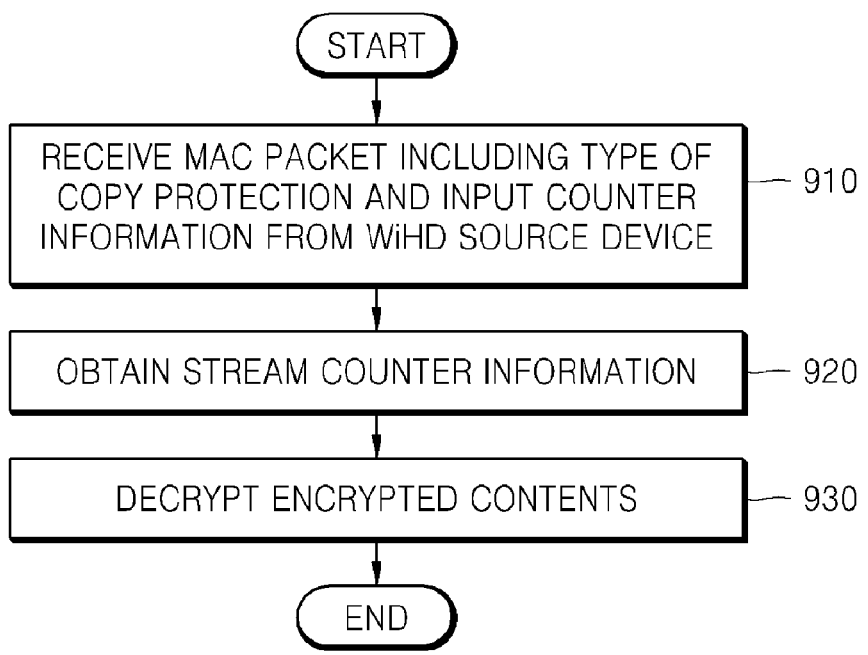
FIG. 9 is a flowchart illustrating a method of protecting against copying HD contents transmitted in a WiHD network by using a WiHD sink device, according to an exemplary embodiment.

FIG. 9 is a flowchart illustrating a method of protecting against copying HD contents transmitted in a WiHD network by using a WiHD sink device, according to an exemplary embodiment. Referring to FIG. 9, in Operation 910, the WiHD sink device 150 receives the MAC packet including the type of copy protection and the input counter information from the WiHD source device 110. The input counter information represents the number of MAC sub-packets that are obtained by segmenting the encrypted contents.

In Operation 920, the WiHD sink device 150 obtains the stream counter information that is calculated from the stream identifier. When the MAC packet received in Operation 910 includes the stream counter information, the WiHD sink device 150 may obtain the stream counter information by depacketizing the MAC packet. When the MAC packet received in Operation 910 does not include the stream counter information, the WiHD sink device 150 may directly calculate the stream counter information from the stream identifier for identifying streams for transmitting contents.

In Operation 930, the WiHD sink device 150 decrypts the contents that are encrypted using the input counter information and the stream counter information.

Figure 10:
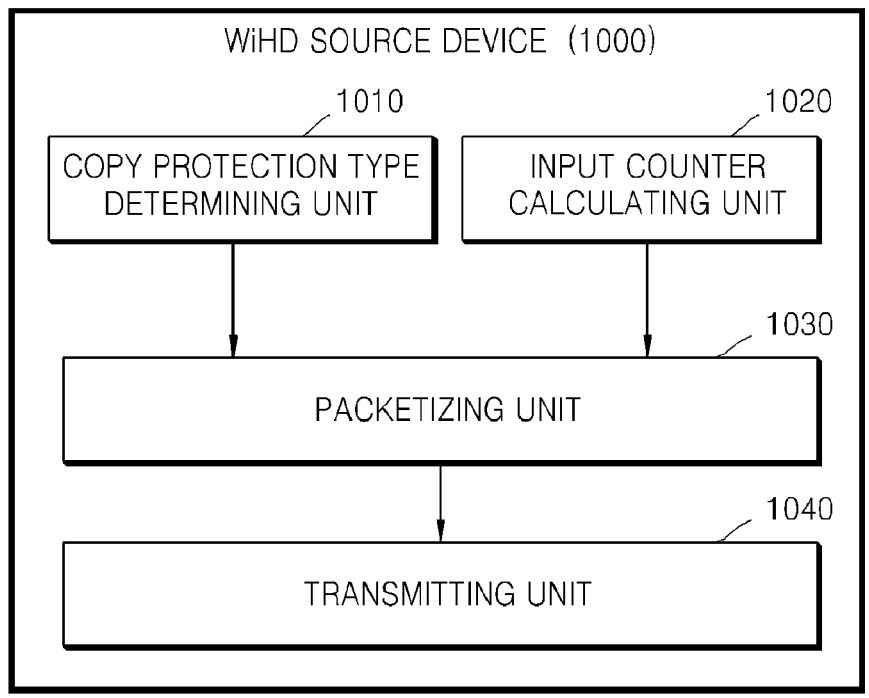
FIG. 10 is a schematic diagram of a WiHD source device according to an exemplary embodiment.

FIG. 10 is a schematic diagram of a WiHD source device 1000 according to an exemplary embodiment. Referring to FIG. 10, the WiHD source device 1000 includes a copy protection type determining unit 1010, an input counter calculating unit 1020, a packetizing unit 1030, and a transmitting unit 1040. Each "unit" comprises hardware.

The copy protection type determining unit 1010 determines the type of copy protection of contents transmitted in the WiHD network by using a MAC packet.

The input counter calculating unit 1020 determines the number of MAC sub-packets that constitute a MAC payload which includes the contents as input counter information.

A stream counter calculating unit (not shown) calculates stream counter information from a stream identifier for identifying streams for transmitting contents.

The packetizing unit 1030 packetizes the type of copy protection determined into the MAC packet and the calculated input counter information, respectively. The packetizing unit 1030 packetizes the type of copy protection into a CP header of the MAC packet and packetizes the input counter information into a CP sub-packet header of each of MAC sub-packets. The packetizing unit 1030 may also packetize the stream counter information into a MAC header of the MAC packet or a MAC sub-packet header of each MAC sub-packet. The packetizing unit 1030 may packetize the type of copy protection of the contents into a MAC capability IE that is transmitted when the WiHD source device 1000 joins in the WiHD network.

The transmitting unit 1040 transmits the MAC packet to the WiHD sink device 150. The MAC packet may be a HRP MAC packet or an LRP MAC packet. The payload of the MAC packet includes contents that are encrypted using the input counter information and the stream counter information.

Figure 11:
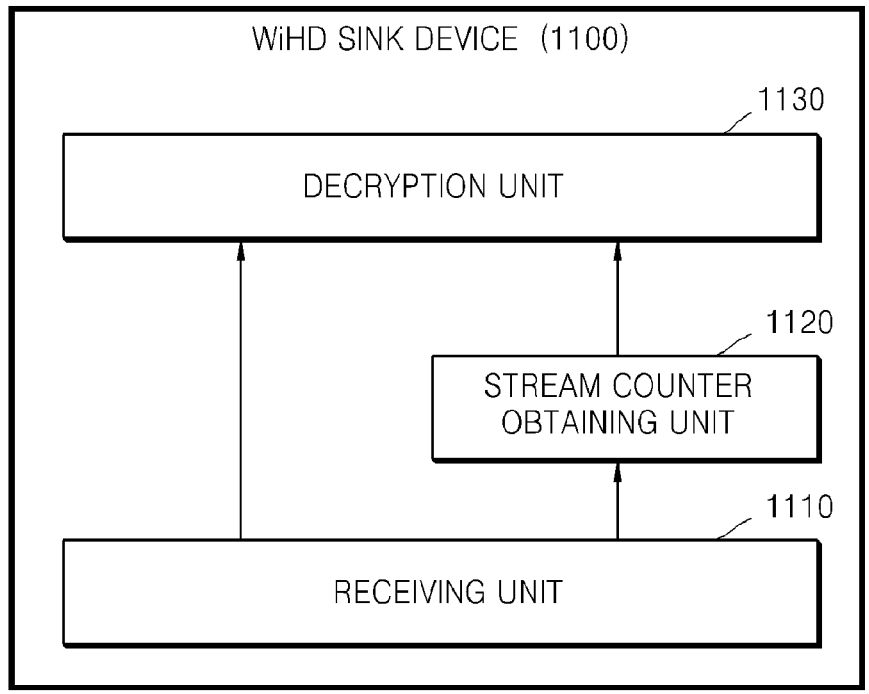
FIG. 11 is a schematic diagram of a WiHD sink device according to an exemplary embodiment.

FIG. 11 is a schematic diagram of a WiHD sink device 1100 according to an exemplary embodiment. Referring to FIG. 11, the WiHD sink device 1100 includes a receiving unit 1110, a stream counter obtaining unit 1120, and a decryption unit 1130. Each "unit" comprises hardware.

The receiving unit 1110 receives a MAC packet including the type of copy protection and input counter information from the WiHD source device 110. The MAC packet may be a HRP MAC packet or an LRP MAC packet. The input counter information represents the number of MAC sub-packets that are obtained by segmenting the encrypted contents.

The stream counter obtaining unit 1120 obtains stream counter information from a stream identifier. When the MAC packet received by the receiving unit 1110 includes the stream counter information, the WiHD sink device 1100 may obtain the stream counter information by depacketizing the MAC packet. When the MAC packet received by the receiving unit 1110 does not include the stream counter information, the WiHD sink device 1100 may directly calculate the stream counter information from the stream identifier for identifying streams for transmitting contents.

The decryption unit 1130 decrypts the encrypted contents by using the input counter information and the stream counter information.

For example, the WiHD source device 1000 of FIG. 10 or the WiHD sink device 1100 of FIG. 11 may include a bus coupled to each of units of the WiHD source device 1000 of FIG. 10 or the WiHD sink device 1100 of FIG. 11, at least one processor coupled to the bus, and a memory storage unit coupled to the bus so as to store a command, a received message, or a generated message and coupled to at least one processor for executing the command, the received message or generated message.

An exemplary embodiment can also be embodied as computer readable codes recorded on a computer readable recording medium for causing a computer to execute a method. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable codes may be distributed over network coupled computer systems so that the computer readable codes are recorded on a computer readable medium of at least one of the computers included within the network, and executed therein.

While the exemplary embodiments have been particularly shown and described, it will be understood by those of ordinary skill in the art that various changes in form and details may be made therein without departing from the spirit and scope of the present invention as defined by the following claims.

What is claimed is:

1. A method of protecting against copying contents transmitted in a wireless HD (WiHD) network by using a WiHD source device, the method comprising:
   determining a type of copy protection of contents transmitted in the WiHD network;
   calculating accumulatively a number of media access control (MAC) sub-packets as input counter information, wherein the MAC sub-packets constitute a MAC payload comprising the contents;
   packetizing the type of copy protection and the input counter information into a MAC packet; and
   transmitting the MAC packet to a WiHD sink device.

2. The method of claim 1, wherein the type of copy protection of the contents comprises at least one of digital transmission content protection (DTCP) and high-bandwidth digital content protection (HDCP).

3. The method of claim 1, wherein the packetizing the type of copy protection and the input counter information comprises packetizing the type of copy protection into a content protection (CP) header of the MAC packet and packetizing the input counter information into CP sub-packet headers of the MAC sub-packets.

4. The method of claim 1, further comprising calculating stream counter information from a stream identifier which identifies a stream used for transmitting the contents.

5. The method of claim 4, further comprising packetizing the stream counter information into a MAC header of the MAC packet or MAC sub-packet headers of the MAC sub-packets.

6. The method of claim 4, wherein the MAC payload comprises the contents that are encrypted by the WiHD source device using the input counter information and the stream counter information.

7. The method of claim 1, further comprising packetizing the type of copy protection of the contents into a MAC capability information element (IE) transmitted when the WiHD source device joins in the WiHD network.

8. The method of claim 1, wherein the MAC packet is a high rate physical layer (PHY) (HRP) MAC packet or a low rate PHY (LRP) MAC packet transmitted in the WiHD network.

9. A method of protecting against copying contents transmitted in a wireless HD (WiHD) network by using a WiHD sink device, the method comprising:
   receiving a media access control (MAC) packet comprising input counter information and a type of copy protection of encrypted contents transmitted in the WiHD network from a WiHD source device, wherein the input counter information is accumulatively calculated with a number of media access control (MAC) sub-packets, and the MAC sub-packets constitute a MAC payload comprising the encrypted contents;
   obtaining stream counter information calculated from a stream identifier for identifying a stream for transmitting the encrypted contents; and
   decrypting the encrypted contents by using the input counter information and the stream counter information.

10. The method of claim 9, wherein the type of copy protection of the encrypted contents comprises at least one of digital transmission content protection (DTCP) and high-bandwidth digital content protection (HDCP).

11. The method of claim 9, wherein the obtaining of the stream counter information comprises, if the received MAC packet comprises the stream counter information, depacketizing the MAC packet, and, if the received MAC packet does not comprise the stream counter information, directly calculating the stream counter information by the WiHD sink device from a stream identifier which identifies a stream used for transmitting the contents.

12. The method of claim 9, wherein the MAC packet is a high rate physical layer (PHY) (HRP) MAC packet or a low rate PHY (LRP) MAC packet transmitted in the WiHD network.

13. A wireless high definition (WiHD) source device, the WiHD source device comprising:
   a copy protection type determining unit which determines a type of copy protection of contents transmitted in a WiHD network;
   an input counter calculating unit which calculates accumulatively a number of media access control (MAC) sub-packets as input counter information, wherein the MAC sub-packets constitute a MAC payload comprising the contents;
   a packetizing unit which packetizes the type of copy protection and the input counter information into a MAC packet; and
   a transmitting unit which transmits the MAC packet to a WiHD sink device.

14. The WiHD source device of claim 13, wherein the type of copy protection of contents comprises at least one of digital transmission content protection (DTCP) and high-bandwidth digital content protection (HDCP).

15. The WiHD source device of claim 13, wherein the packetizing unit packetizes the type of copy protection into a content protection (CP) header of the MAC packet and packetizes the input counter information into CP sub-packet headers of the MAC sub-packets.

16. The WiHD source device of claim 13, further comprising a stream counter calculating unit which calculates stream counter information from a stream identifier which identifies a stream used for transmitting the contents.

17. The WiHD source device of claim 16, wherein the packetizing unit packetizes the stream counter information into a MAC header of the MAC packet or MAC sub-packet headers of the MAC sub-packets.

18. The WiHD source device of claim 16, wherein the MAC payload comprises the contents that are encrypted by the WiHD source device using the input counter information and the stream counter information.

19. The WiHD source device of claim 13, wherein the packetizing unit packetizes the type of copy protection of the contents into a MAC capability information element (IE) transmitted when the WiHD source device joins in the WiHD network.

20. The WiHD source device of claim 13, wherein the MAC packet is a high rate physical layer (PHY) (HRP) MAC packet or a low rate PHY (LRP) MAC packet transmitted in the WiHD network.

21. A wireless high definition (WiHD) sink device, the WiHD sink device comprising:
a receiving unit which receives a media access control (MAC) packet comprising input counter information and a type of copy protection of encrypted contents transmitted in the WiHD network from a WiHD source device, wherein the input counter information is accumulatively calculated with a number of media access control (MAC) sub-packets, and the MAC sub-packets constitute a MAC payload comprising the encrypted contents;
a stream counter obtaining unit which obtains stream counter information calculated from a stream identifier which identifies a stream used for transmitting the contents; and
a decryption unit for decrypting the encrypted contents by using the input counter information and the stream counter information.

22. The WiHD sink device of claim 21, wherein the type of copy protection of the encrypted contents comprises at least one of digital transmission content protection (DTCP) and high-bandwidth digital content protection (HDCP).

23. The WiHD sink device of claim 21, wherein, if the received MAC packet comprises the stream counter information, the stream counter obtaining unit obtains the stream counter information by depacketizing the MAC packet, and, if the received MAC packet does not comprise the stream counter information, the stream counter obtaining unit obtains the stream counter information by directly calculating the stream counter information from a stream identifier which identifies a stream used for transmitting the contents.

24. The WiHD sink device of claim 21, wherein the MAC packet is a high rate physical layer (PHY) (HRP) MAC packet or a low rate PHY (LRP) MAC packet transmitted in the WiHD network.

25. A non-transitory computer readable recording medium having embodied thereon a program which causes a computer to execute a method of protecting against copying contents transmitted in a wireless HD (WiHD) network by using a WiHD source device, the method comprising:
determining a type of copy protection of contents transmitted in the WiHD network;
calculating accumulatively a number of media access control (MAC) sub-packets as input counter information, wherein the MAC sub-packets constitute a MAC payload comprising the contents;
packetizing the type of copy protection and the input counter information into a MAC packet; and
transmitting the MAC packet to a WiHD sink device.

26. A non-transitory computer readable recording medium having embodied thereon a program which causes a computer to execute a method of protecting against copying contents transmitted in a wireless HD (WiHD) network by using a WiHD sink device, the method comprising:
receiving a media access control (MAC) packet comprising input counter information and a type of copy protection of encrypted contents transmitted in the WiHD network from a WiHD source device, wherein the input counter information is accumulatively calculated with a number of media access control (MAC) sub-packets, and the MAC sub-packets constitute a MAC payload comprising the encrypted contents;
obtaining stream counter information calculated from a stream identifier for identifying a stream for transmitting the encrypted contents; and
decrypting the encrypted contents by using the input counter information and the stream counter information.

27. A method of protecting against copying contents transmitted in a wireless HD (WiHD) network by using a WiHD source device, the method comprising:
determining, by the WiHD source device, a type of copy protection of contents transmitted in the WiHD network;
segmenting, by the WiHD source device, the contents into a plurality of media access control (MAC) sub-packets, wherein the plurality of MAC sub-packets of a MAC payload comprising the contents;
calculating, by the WiHD source device, a number of MAC sub-packets as input counter information;
packetizing, by the WiHD source device, the type of copy protection and the input counter information into a MAC packet comprising the plurality of MAC sub-packets; and
transmitting, by the WiHD source device, the MAC packet to a WiHD sink device.

28. The method of claim 27, wherein the input counter information represents the number of MAC sub-packets that are obtained by segmenting the contents.

29. The method of claim 27, wherein the packetizing the type of copy protection and the input counter information comprises packetizing the type of copy protection into a content protection (CP) header of the MAC packet and packetizing the input counter information into CP sub-packet headers of the plurality of MAC sub-packets.

30. The method of claim 27, further comprising calculating stream counter information from a stream identifier which identifies a stream used for transmitting the contents.

31. The method of claim 30, further comprising packetizing the stream counter information into a MAC header of the MAC packet or MAC sub-packet headers of the MAC sub-packets.

* * * * *